United States Patent
Chen et al.

(10) Patent No.: US 10,440,315 B2
(45) Date of Patent: Oct. 8, 2019

(54) APPARATUS AND METHOD FOR SWITCHING VIDEO SIGNAL

(71) Applicant: ATEN International Co., Ltd., New Taipei (TW)

(72) Inventors: Hao-Jun Chen, New Taipei (TW); Hao-Tai Hsu, Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 16/192,052

(22) Filed: Nov. 15, 2018

(65) Prior Publication Data
US 2019/0158778 A1 May 23, 2019

(30) Foreign Application Priority Data
Nov. 17, 2017 (TW) .............................. 106139970 A (51) Int. Cl.
*H04N 7/01* (2006.01)
*H04N 5/268* (2006.01)
(Continued)

(52) U.S. Cl.
CPC ............... *H04N 7/01* (2013.01); *G09G 5/005* (2013.01); *G09G 5/006* (2013.01); *G09G 5/399* (2013.01);
(Continued)

(58) Field of Classification Search
CPC ........ H04N 7/01; H04N 7/012; H04N 7/0125; H04N 5/92; H04N 5/268; H04N 5/44; H04N 5/46; G09G 5/006; G09G 2370/14
(Continued)

(56) References Cited

U.S. PATENT DOCUMENTS 6,559,893 B1 * 5/2003 Martin .................. H04N 5/775
348/554
2003/0147013 A1 * 8/2003 Martin .................. H04N 5/268
348/706
(Continued)

FOREIGN PATENT DOCUMENTS

| TW | 200818887 A | 4/2008 |
|----|----|----|
| TW | I387295 B | 2/2013 |
| TW | M450149 U | 4/2013 |

OTHER PUBLICATIONS

Taiwanese Office Action, dated May 23, 2018, in a counterpart Taiwanese patent application, No. TW 106139970.

*Primary Examiner* — Sherrie Hsia
(74) *Attorney, Agent, or Firm* — Chen Yoshimura LLP (57) ABSTRACT

A video signal switching apparatus includes a signal selection device which selectively outputs received multiple video signals to its first and second output ports; and a signal switching device, which includes first and second signal conversion devices coupled to the first and second output ports, and a switch which selectively couples the first or second signal conversion device to a switch output. The first signal conversion device receives a first video signal having a first format from the first output port and converts it to a first converted video signal having a second format. While the switch selectively couples the first converted video signal from the first signal conversion device to the switching output, the second signal conversion device receives a second video signal having a first format from the second output port and converts it to a second converted video signal having the second signal format.

14 Claims, 5 Drawing Sheets

(51) Int. Cl.
  *G09G 5/00*   (2006.01)
  *H04N 5/92*   (2006.01)
  *G09G 5/399*  (2006.01)
  *G09G 5/393*  (2006.01)
(52) U.S. Cl.
  CPC ............... *H04N 5/268* (2013.01); *H04N 5/92* (2013.01); *G09G 5/393* (2013.01); *G09G 2370/14* (2013.01); *G09G 2370/20* (2013.01)
(58) Field of Classification Search
  USPC ................ 348/441, 705, 706, 555, 554, 725
  See application file for complete search history.

(56) References Cited

U.S. PATENT DOCUMENTS

2009/0219447 A1   9/2009   Choi
2009/0222905 A1   9/2009   Choi et al.

\* cited by examiner

|  | Time T0 | Time T1 | Time T2 | Time T3 | Time T4 | Time Tn |
|---|---|---|---|---|---|---|
| Signal outputted by first output port | S1, U | S1, L, P | S3, U | S3, L, P | S5, U | ... |
| Signal outputted by second output port | S2, U | S2, U | S2, L, P | S4, U | S4, L, P | ... |
| Video signal processor output | X | X | S1 | S2 | S3 | ... |

Fig. 5

APPARATUS AND METHOD FOR SWITCHING VIDEO SIGNAL

BACKGROUND OF THE INVENTION

Field of the Invention

This invention relates to signal switching method and apparatus, and in particular, it relates to signal switching method and apparatus that implement pre-processing of the signals to reduce overall switching time.

Description of Related Art

With the development of video technologies, video matrix switches are now commonly provided with network streaming functions. Using the multiple-input, single-output function of a video matrix switch, a streaming video system, such as a surveillance system, can utilize the video matrix switch to achieve cycled switching or collage display, and output the images to a display screen or TV wall.

Figure 1:
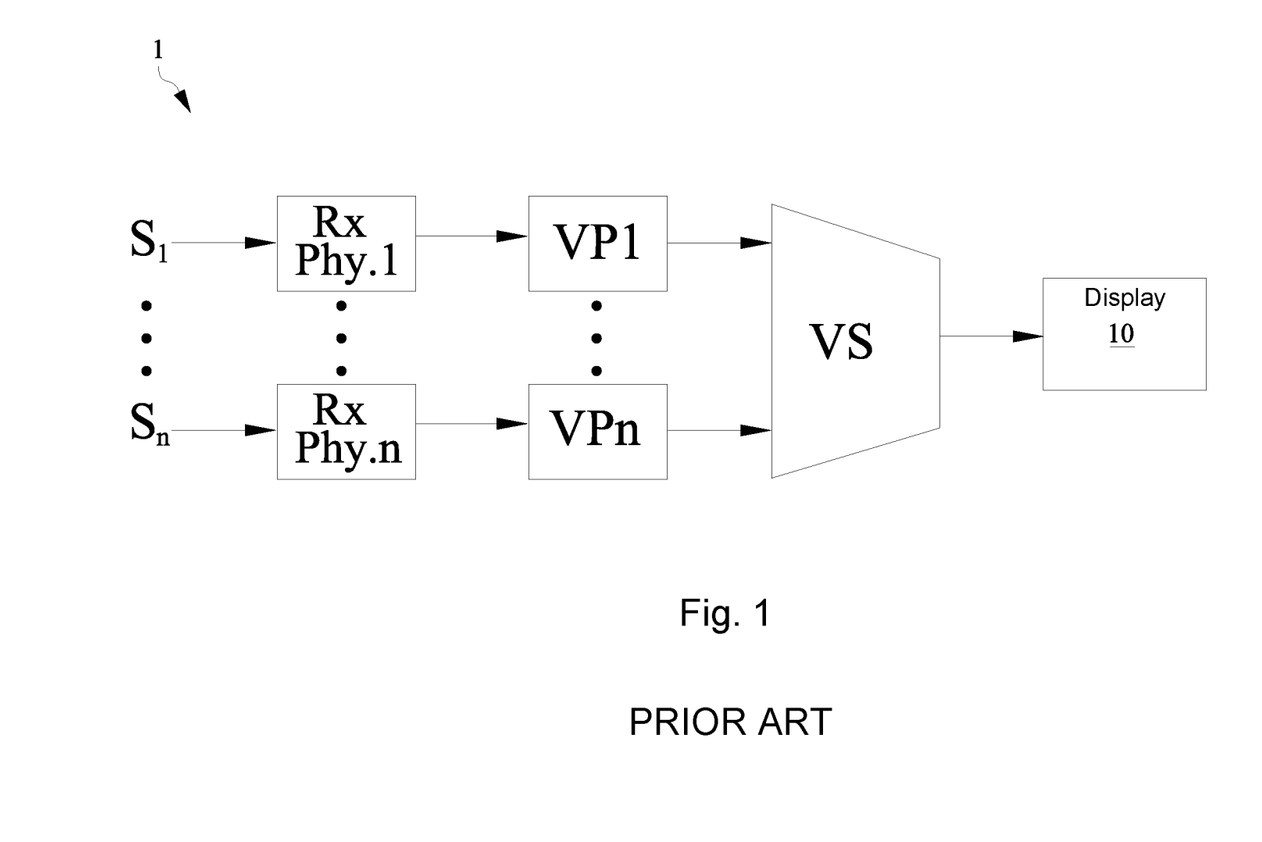
FIG. 1 schematically illustrates the architecture of a conventional video matrix switch.

Refer to FIG. 1, which illustrates the architecture of a conventional video matrix switch. The conventional video matrix switch includes multiple image input ports S1-Sn. Multiple front-end physical layer processor chips Rx Phy.1-Rx Phy.n are correspondingly coupled to the multiple image input ports S1-Sn, and the multiple front-end physical layer processor chips Rx Phy.1-Rx Phy.n are in turn coupled to corresponding multiple video processor chips VP1-VPn. In the conventional technology, each front-end physical layer processor chip Rx Phy.1-Rx Phy.n receives a video signal from the corresponding image input port S1-Sn, performs signal pre-processing, and then outputs the pre-processed signal to the corresponding video processor chip VP1-VPn for further processing. Because different image input ports S1-Sn of the video matrix switch 1 can have different formats, before outputting to the display screen 10, the video processor chips VP1-VPn perform signal processing to convert the signals to a uniform format. Finally, the video matrix switch VS selectively transmits the processed video signals to the display screen 10.

The switching architecture of FIG. 1 can achieve cycled switching or collage display for streaming videos. However, because the video processor chips VP1-VPn are located on the input side of the video switch VS, each one of the physical layer processor chips Rx Phy.1-Rx Phy.n needs to be coupled to a corresponding one of the video processor chips VP1-VPn; this increases the cost and complexity of the video matrix switch 1.

Figure 2:
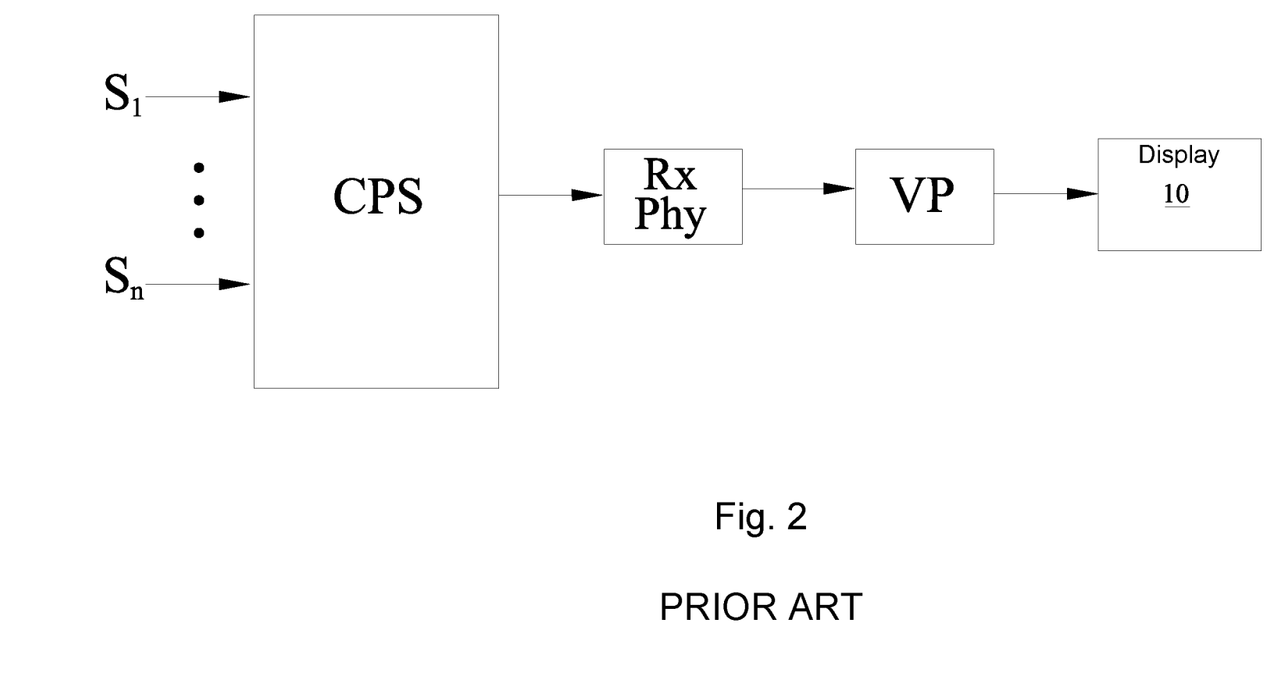
FIG. 2 schematically illustrates the architecture of another conventional video matrix switch which can solve the problem of high cost and complexity of the video matrix switch of FIG. 1.

Refer to FIG. 2, which illustrates the architecture of an alternative video matrix switch which can solve the problem of high cost and complexity of the video matrix switch of FIG. 1. In the architecture shown in FIG. 2, a cross point switch CPS is coupled to multiple image input ports S1-Sn to receive video signals from the sources. A physical layer processor chip Rx Phy and a video processor chip VP are coupled after the cross point switch CPS. Because the video processor chip VP is located after the cross point switch CPS, the number of video processor chips VP is reduced, which lowers cost and system complexity. However, in the architecture of FIG. 2, the required signal processing time of the physical layer processor chip Rx Phy is about 150 ms, and the required signal processing time of the video processor chip VP is about 200 ms. Thus, although this architecture reduces cost and complexity by reducing the number of physical layer processor chips Rx Phy and video processor chips VP, it has the problem that the switching time is long because the new image in each switching operation must wait for both the signal processing times of the physical layer processor chip Rx Phy and the processor chip VP.

SUMMARY

The present invention is directed to a video signal switching apparatus and method which, during video signal switching, can utilize the time while the foreground is output to the video processor and being processed, switch to another video output port using the video switch, to receive the next scheduled video signal, i.e. the video signal that is scheduled to be output next, and perform signal conversion for that signal; thus, when it is time to output the next scheduled video signal, because the video signal switching apparatus has already performed signal conversion for that signal, the already converted signal can be sent directly to the video processor. This effectively saves overall processing time, which shortens the delay associated with video switching.

Thus, the present invention provides a video signal switching apparatus and method, where the video signal processor is disposed downstream of the video signal switch. As a result, only one signal processor is required to process video signals from multiple input sources. This reduces the cost and simplifies the component layout of the switching device.

One embodiment of the present invention provides a video signal switching apparatus, which includes a signal selection device and a signal switching device. The signal selection device has a first output port and a second output port, where the signal selection device receives multiple video signals each having a first signal format, and selectively outputs some of these video signals via the first output port and the second output port. The signal switching device includes a first signal conversion device, a second signal conversion device, and a switch. The first signal conversion device is electrically coupled to the first output port of the signal selection device to receive a first video signal from the first output port, and performs a first signal conversion to convert the first video signal to a converted signal having a second signal format. The second signal conversion device is electrically coupled to the second output port of the signal selection device. The switch selectively electrically couples either the first signal conversion device or the second signal conversion device to a switching output. While the switch selectively couples the first signal conversion device to the switching output to output the first converted video signal, the second signal conversion device receives a second video signal among the multiple video signals from the second output port of the signal selection device and performs another first signal conversion processing to convert the second video signal to a second converted video signal having the second signal format. Preferably, the signal selection device selects the first and second video signals from among the multiple video signals based on a scheduled display sequence which has been predefined, wherein the second video signal is one that is to be displayed immediately after the first video signal according to the scheduled display sequence.

In another aspect, the present invention provides a video signal switching method, implemented in a video signal switching apparatus, where the video signal switching apparatus includes a signal selection device and a signal switching device, the signal switching device having a first signal conversion device, a second signal conversion device and a switch. The video signal switching method includes the following steps. The signal selection device receives multiple video signals each having a first signal format. The first signal conversion device receives, from the signal selection device, a first video signal among the multiple video signals, and performs a first signal conversion processing to convert the first video signal to a first converted video signal having a second signal format. The switch selectively switches to the first signal conversion device to receive and output the first converted video signal. While the switch is selectively switched to the first signal conversion device, the second signal conversion device receives a second video signal from the signal selection device and performs another first signal conversion processing.

In one embodiment, the video signal switching apparatus further includes a video signal processor, electrically coupled to the switching output of the switch, configured to receive the converted video signal from the switch and to perform a second signal conversion processing on it.

In one embodiment, the signal selection device, the signal switching device and the video signal processor are integrated on a single chip.

In one embodiment, each of the multiple video signals is an analog video signal or a digital video signal, and the first and second converted video signals are Transistor-to-Transistor Logic (TTL) or Low Voltage Differential Signal (LVDS) signals.

In one embodiment, each of the multiple video signals is a network packet signal.

DETAILED DESCRIPTION OF PREFERRED EMBODIMENTS

Figure 3:
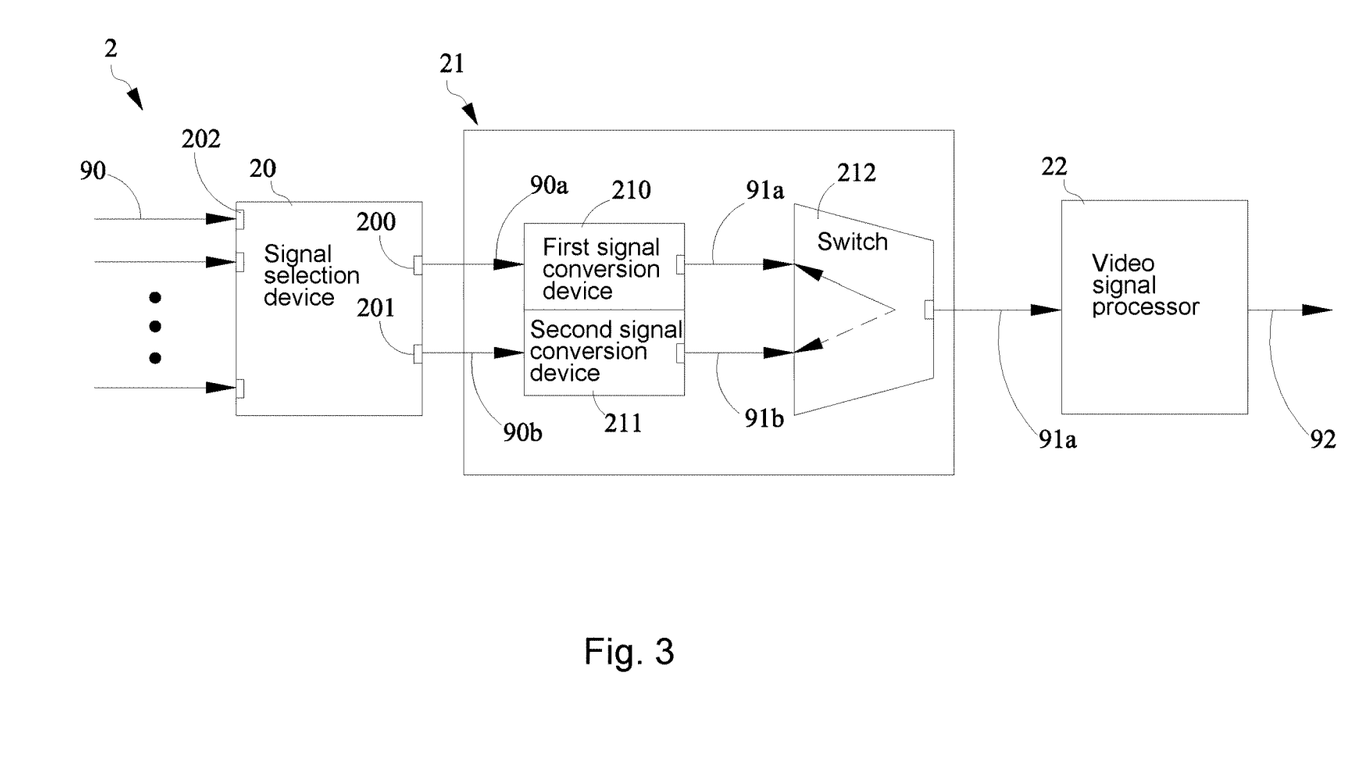
FIG. 3 is a block diagram that illustrates a video signal switching apparatus according to an embodiment of the present invention.

Refer to FIG. 3, which is a block diagram that illustrates a video signal switching apparatus according to an embodiment of the present invention. In this embodiment, the video signal switching apparatus 2 includes a signal selection device 20, a signal switching device 21 and a video signal processor 22. The signal selection device 20 includes a first output port 200, a second output port 201, and multiple input ports 202. The multiple input ports 202 are configured to be coupled to multiple video signal sources to receive multiple video signals 90, each video signal having a first signal format. It should be noted that the first signal formats for the different video signals 90 may be the same or different. Each video signal 90 may be an analog signal or a digital signal; the first signal format may be, without limitation, High Definition Multimedia Interface (HDMI), Digital Visual Interface (DVI), DisplayPort (DP), Video Graphics Array (VGA), etc. In another embodiment, the video signal is a network packet signal. The signal selection device 20 selects one of the multiple video signals 90 to couple to the first output port 200 and another one to couple to the second output port 201, such that each of the first output port 200 and the second output port 201 outputs one of the video signals 90. In one embodiment, the signal selection device 20 may be, without limitation, a cross point switch with at least two outputs.

Because the video signal switching apparatus 2 is electrically coupled to multiple signal sources to receive the multiple video signals 90, the video signal switching apparatus 2 may be set to output different manners of display, such as divided images, i.e., the video signal from one signal source is divided into multiple video images for output; or collage, i.e., some or all video signals from the multiple signal sources are pieced together to form one video image for output; or cycled switching, i.e., some or all video signals from the multiple signal sources are output sequentially in a predefined sequence in a cycling manner.

The signal switching device 21 includes a first signal conversion device 210, a second signal conversion device 211, and a switch 212. In this embodiment, the first signal conversion device 210 is electrically coupled to the first output port 200, configured to receive a first-scheduled video signal 90a output by the first output port 200, and performs first signal conversion processing for it to output a converted signal 91a having a second signal format. The second signal conversion device 211 is electrically coupled to the second output port 201, configured to receive a second-scheduled video signal 90b output by the second output port 201, and performs first signal conversion processing for it to output a converted signal 91b having the second signal format. Here, "first-scheduled" and "second-scheduled" (and later, "third-scheduled" etc.) video signals refer to the signals from the sources that are scheduled to be displayed first, second, etc. according to the predefined schedule (i.e. sequence) of displaying the multiple video signals. In one embodiment, the first signal conversion device 210 and the second signal conversion device 211 are front-end physical layer processor chips Rx Phy. The second signal format may be Transistor-to-Transistor Logic (TTL) or Low Voltage Differential Signal (LVDS) format. Preferably, the second signal format is the same for the two signal conversion devices 210 and 211. The switch 212 is configured to selectively switch either the first signal conversion device 210 or the second signal conversion device 211 but not both to electrically couple to the video signal processor 22, so that the converted signal 91a or 91b from the first signal conversion device 210 or the second signal conversion device 211 is output to the video signal processor 22.

The video signal processor 22 is electrically coupled to the switch 212 of the signal switching device 21, configured to receive the converted signal 91a or 91b outputted by the switch 212, and performs a second signal conversion processing for the converted signal 91a or 91b, to generate an output video signal 92 having a third signal format. In one embodiment, the third signal format of the output video signal 92 is a signal format that can be accepted by the display device, so the output video signal 92 can be received by at least one display device coupled to the video signal processor 22 to display the video image. In one embodiment, the video signal processor 22 also performs restart, image scaling, and image compression processing. It should be noted that, depending on chip development needs, the signal selection device 20, the signal switching device 21 and the video signal processor 22 may be integrated into one chip, or the signal selection device 20 and the signal switching device 21 may be integrated into one chip, etc., without limitation.

Figure 4:
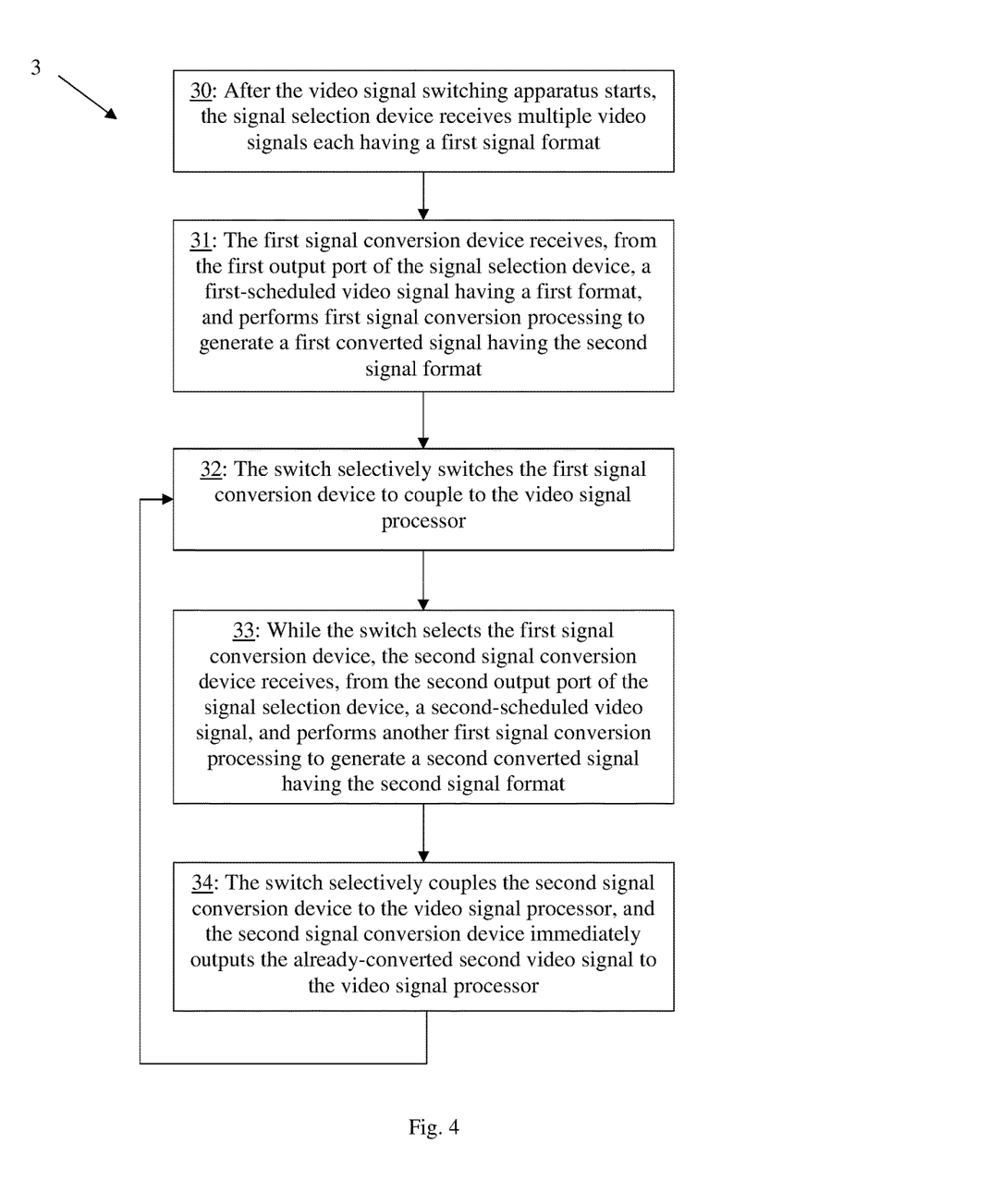
FIG. 4 is a flowchart that illustrates a video signal switching method according to an embodiment of the present invention.
Figure 5:
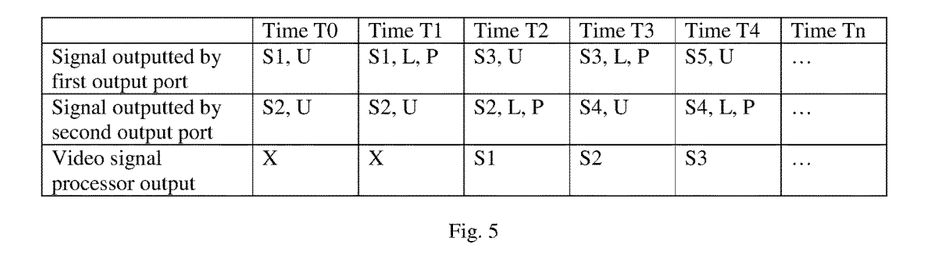
FIG. 5 illustrates the signal switching states at various time points during video signal switching according to an embodiment of the present invention.

Refer to FIG. 4, which is a flowchart that illustrates a video signal switching method according to an embodiment of the present invention. In one embodiment, the video signal switching method is implemented in the video signal switching apparatus 2 shown in FIG. 3. The video signal switching apparatus 2 is coupled to multiple video signal sources, and can be set to define a display schedule (i.e. sequence), to sequentially output some or all of the video signals from the multiple video signal sources. Referring to FIGS. 3-5 together, in FIG. 5, Sn (n=1 to n) represent signal sources, where each signal source Sn respectively outputs a video signal 90 to the signal selection device 20, as shown in FIG. 3. U represents an unlocked state, i.e., a state where the first or signal conversion device 210 or 211 is converting the video signal 90 (90a or 90b) to the converted signal 91a or 91b but the switch 212 is not sending the converted signal 91a or 91b to the signal processor 22. The converted signal 91a or 91b may be a TTL signal as mentioned earlier. L represents a locked state, i.e., a state where the first or second signal conversion device 210 or 211 has converted the video signal 90 (90a or 90b) to the converted signal 91a or 91b, and the switch 212 is sending the converted signal to the signal processor 22 to be processed. P represents that while in the locked state, the video signal processor 22 is processing the converted signal 91a or 91b. The last row in FIG. 5 represents the output of the signal processor 22 at the corresponding time point, where X represents no output.

The video signal switching method 3 includes the following steps. First, in step 30, after the video signal switching apparatus 2 starts, the signal selection device 20 receives multiple video signals 90 each having a first signal format. Then, in step 31, as shown in FIG. 5, at time point T0, the first signal conversion device 210 and the second signal conversion device 211 respectively receive the first-scheduled video signal 90a having a first format and the second-scheduled video signal 90b having a first format, from the respective first output port 200 and second output port 201 of the signal selection device 20. In one embodiment, the video signal 90a is an HDMI format signal, and the converted signal 91a is a TTL format signal. After the time point T0, the first signal conversion device 210 and the second signal conversion device 211 respectively perform first signal conversion processing for the video signals 90a and 90b, as represented in FIG. 5 by the (S1, U) and (S2, U) states.

Then, in step 32, at time point T1, the switch 212 selectively switches the first signal conversion device 210 to couple to the video signal processor 22, so that the switch 212 receives the converted signal 91a and outputs it to the video signal processor 22, as represented in FIG. 5 by the (S1, L, P) state. Note that at this time point, the streaming output as shown in the last row of FIG. 5 is still "no output" because video processing by video processor 22 takes time, but the signal S1 will start to be outputted shortly after this time point. In step 33, when the switch 212 selects the first signal conversion device 210, i.e., when the converted signal 91a is output to the video signal processor 22, the second signal conversion device 211 receives, from the second output port 201 of the signal selection device 20, the second-scheduled video signal 90b and performs another first signal conversion processing to generate the converted signal 91b having the second signal format, as represented in FIG. 5 by the (S2, U) state. The converted signal 91b is not output by the switch 212 to the video signal processor 22. These states continue until the time of the next switching operation.

Then, at time point T2, step 34 is performed, where the switch 212 selectively couples the second signal conversion device 211 to the video signal processor 22 to output the second-scheduled video signal, and at this time the second signal conversion device 211 immediately outputs the already-converted signal 91b to the video signal processor 22, as represented in FIG. 5 by the (S2, L, P) state. Note that at this time point, the streaming output as shown in the last row of FIG. 5 is still S1 because video processing by video processor 22 takes time, but the signal S2 will start to be outputted shortly after this time point. Also in step 34, the first signal conversion device 210 starts to receive the next (third) scheduled video signal S3 from the first output port 200 and performs the first signal conversion processing on it to generate a converted signal, as represented in FIG. 5 by the (S3, U) state. This converted signal is not output by the switch 212 to the video signal processor 22. These states continue until the next time point T3, when video switching is performed to output the third-scheduled video signal; at this time, the switch selectively couples the first signal conversion device 210 to the video signal processor 22, and the first signal conversion device 210 immediately outputs the already converted signal to the video signal processor 22, as represented in FIG. 5 by the (S3, L, P) state. The process flow can return to step 32 to repeat the previously described steps, for time points T4, T5, . . . to Tn, to stream fourth-scheduled signal S4, fifth-scheduled signal S5, etc. as shown in FIG. 5.

In this method, the signal selection device 20 is provided with the scheduled display sequence of the video sources S1-Sn, and outputs the video signals, in the scheduled sequence, alternatingly to the first and second output ports 200 and 201. Thus, the signal selection device 20 can provide the video signal that is next scheduled to be displayed before the switching occurs. This is possible because the scheduled display sequence is predefined.

It can be seen that, in the conventional device shown in FIG. 2, although cost and layout complexity can be reduced, it has the problem that, when switching the first-scheduled video signal to the second-scheduled video signal, because each video signal must be processed by the physical layer processor chip Rx Phy and then processed by the video processor chip VP, the delay between the two video signals when switching video sources is the total of the processing times of the physical layer processor chip Rx Phy and the video processor chip VP. As a result, there is a delay during switching, which reduces switching speed.

To the contrary, in the embodiment of the present invention shown in FIG. 4, it can be seen from FIG. 5 that by using step 33, i.e., during the time when the switch 212 locks the first signal conversion device 210 to output the first-scheduled converted signal 91a to the video signal processor 22 for foreground signal conversion processing, the second signal conversion device 211 receives the second-scheduled video signal 90b from the second output port 201, and simultaneously performs signal conversion of the video signal 90b in the background while the switch 212 locks the first signal conversion device 210. The time required for signal conversion by the second signal conversion device 211 is typically less than the time required for signal processing of the converted signal 91a by the video signal processor 22. For example, in one embodiment, the first signal conversion processing time by the first and second signal conversion device 210 and 211 is about 150 ms, while the second signal conversion processing time by the video signal processor 22 is longer, for example up to 200 ms, especially when the multiple input video signals have different formats (or different resolutions), since the video signal processor 22 must perform restart, scaling, compression, etc. Thus, when performing the next step 34, i.e. when the switch 212 selectively couples the second signal conversion device 211 to the video signal processor 22, the second signal conversion device 211 can immediately output the already processed converted signal 91b to the video signal processor 22. Thus, switching delay in the conventional technology caused by the signal processing of physical layer processor chip Rx Phy, such as 150 ms, is avoided. This reduces the delay when switching to a new source, and at the same time simplifies component layout to reduce cost.

The process steps 30-34 described above can be implemented as computer executable software or firmware programs stored in nonvolatile memories of the video signal switching apparatus, and executed by various processors.

In summary, the video signal switching apparatus and method according to embodiments of the present invention can efficiently utilize the signal switching technique in which, when the currently-scheduled signal is output to the video signal processor for processing in the foreground, the next-scheduled signal is received at the other output port and processed for signal conversion in the background; thus, when it is time to output the next-scheduled signal, the signal is already processed for signal conversion, so it can be immediately output to the video signal processor. This effectively saves processing time and shortens the delay associated with switching to a new video source.

The various components of the video signal switching apparatus described above may be implemented in electrical circuitry including integrated circuits and/or computer executable program code stored in computer readable nonvolatile memories.

It will be apparent to those skilled in the art that various modification and variations can be made in the video signal switching and method and apparatus of the present invention without departing from the spirit or scope of the invention. Thus, it is intended that the present invention cover modifications and variations that come within the scope of the appended claims and their equivalents.

What is claimed is:

1. A video signal switching apparatus, comprising:
   a signal selection device, having a first output port and a second output port, the signal selection device being configured to receive multiple video signals each having a respective first signal format, and to selectively output some of the video signals to the first output port and the second output port; and
   a signal switching device, including:
      a first signal conversion device, electrically coupled to the first output port of the signal selection device, configured to receive a first video signal among the multiple video signals from the first output port and to perform a first signal conversion processing to convert the first video signal to a first converted video signal having a second signal format;
      a second signal conversion device, electrically coupled to the second output port of the signal selection device;
      a switch, configured to selectively electrically couple either the first signal conversion device or the second signal conversion device to a switching output;
   wherein while the switch selectively couples the first signal conversion device to the switching output to output the first converted video signal, the second signal conversion device receives a second video signal among the multiple video signals from the second output port of the signal selection device and performs another first signal conversion processing to convert the second video signal to a second converted video signal having the second signal format.

2. The video signal switching apparatus of claim 1, further comprising a video signal processor, electrically coupled to the switching output of the switch, configured to perform a second signal conversion processing on the converted video signal received from the switch.

3. The video signal switching apparatus of claim 2, wherein the signal selection device, the signal switching device and the video signal processor are integrated on a single chip.

4. The video signal switching apparatus of claim 1, wherein each of the multiple video signals is an analog video signal or a digital video signal.

5. The video signal switching apparatus of claim 1, wherein the first and second converted video signals are Transistor-to-Transistor Logic (TTL) or Low Voltage Differential Signal (LVDS) signals.

6. The video signal switching apparatus of claim 1, wherein each of the multiple video signals is a network packet signal.

7. The video signal switching apparatus of claim 1, wherein the signal selection device and the signal switching device are integrated on a single chip.

8. The video signal switching apparatus of claim 1, wherein the signal selection device selects the first and second video signals from among the multiple video signals based on a scheduled display sequence which has been predefined, wherein the second video signal is one that is to be displayed immediately after the first video signal according to the scheduled display sequence.

9. A video signal switching method, implemented in a video signal switching apparatus, the video signal switching apparatus including a signal selection device and a signal switching device, the signal switching device having a first signal conversion device, a second signal conversion device and a switch, the video signal switching method comprising:
   the signal selection device receiving multiple video signals each having a first signal format;
   the first signal conversion device receiving, from the signal selection device, a first video signal among the multiple video signals, and performing a first signal conversion processing to convert the first video signal to a first converted video signal having a second signal format;
   the switch selectively switching to the first signal conversion device to receive and output the first converted video signal;
   while the switch is selectively switched to the first signal conversion device, the second signal conversion device receiving a second video signal from the signal selection device and performing another first signal conversion processing to convert the second video signal to a second converted video signal having the second signal format.

10. The video signal switching method of claim 9, wherein the video signal switching apparatus further includes a video signal processor, the method further comprising:
   the video signal processor receiving the converted video signal from the switch and performing a second signal conversion processing on the converted video signal.

11. The video signal switching method of claim 9, wherein each of the multiple video signals is an analog video signal or a digital video signal.

12. The video signal switching method of claim 9, wherein the first and second converted video signals are Transistor-to-Transistor Logic (TTL) or Low Voltage Differential Signal (LVDS) signals.

13. The video signal switching method of claim 9, wherein each of the multiple video signals is a network packet signal.

14. The video signal switching method of claim 9, further comprising:
   the signal selection device selecting the first and second video signals from among the multiple video signals based on a scheduled display sequence which has been predefined, wherein the second video signal is one that is to be displayed immediately after the first video signal according to the scheduled display sequence.

* * * * *